(12) United States Patent
Asai

(10) Patent No.: US 7,756,927 B2
(45) Date of Patent: Jul. 13, 2010

(54) OBJECT FILTERING METHOD AND CLIENT DEVICE USING THE SAME

(75) Inventor: Takayuki Asai, Tokyo (JP)

(73) Assignee: NEC Corporation, Tokyo (JP)

( * ) Notice: Subject to any disclaimer, the term of this patent is extended or adjusted under 35 U.S.C. 154(b) by 2237 days.

(21) Appl. No.: 09/975,505

(22) Filed: Oct. 12, 2001

(65) Prior Publication Data

US 2002/0046295 A1 Apr. 18, 2002

(30) Foreign Application Priority Data

Oct. 18, 2000 (JP) ............................. 2000-317266

(51) Int. Cl.
*G06F 15/16* (2006.01)
*G06F 3/14* (2006.01)
(52) U.S. Cl. ....................... 709/205; 715/864
(58) Field of Classification Search ......... 709/208–232; 345/736
See application file for complete search history.

(56) References Cited

U.S. PATENT DOCUMENTS

| | | | |
|---|---|---|---|
| 5,864,673 A | 1/1999 | Ohto et al. | |
| 6,061,686 A * | 5/2000 | Gauvin et al. | 707/10 |
| 6,065,058 A | 5/2000 | Hailpern et al. | 709/231 |
| 6,169,897 B1 * | 1/2001 | Kariya | 455/456.3 |
| 6,212,529 B1 * | 4/2001 | Boothby et al. | 707/201 |
| 6,300,947 B1 * | 10/2001 | Kanevsky | 345/866 |
| 6,327,616 B1 | 12/2001 | Ohto et al. | |
| 6,374,245 B1 * | 4/2002 | Park | 707/10 |
| 6,397,259 B1 * | 5/2002 | Lincke et al. | 709/236 |
| 6,412,008 B1 | 6/2002 | Fields et al. | |
| 6,421,733 B1 * | 7/2002 | Tso et al. | 709/246 |
| 6,438,576 B1 * | 8/2002 | Huang et al. | 709/202 |
| 6,473,609 B1 * | 10/2002 | Schwartz et al. | 455/406 |
| 6,477,529 B1 * | 11/2002 | Mousseau et al. | 707/5 |
| 6,678,518 B2 * | 1/2004 | Eerola | 455/422.1 |
| 6,681,380 B1 * | 1/2004 | Britton et al. | 717/115 |
| 6,738,614 B1 * | 5/2004 | Blankenship et al. | 455/414.4 |
| 6,769,019 B2 * | 7/2004 | Ferguson | 709/219 |

(Continued)

FOREIGN PATENT DOCUMENTS

GB 2 331 600 A 5/1999

(Continued)

OTHER PUBLICATIONS

Wireless Application Group User Agent Profile Specification (WAG UAPROF), XP002942203, Nov. 10, 1999, pp. 1-76, © Wireless Application Protocol Forum, Ltd.

(Continued)

*Primary Examiner*—David E England
(74) *Attorney, Agent, or Firm*—Foley & Lardner LLP

(57) ABSTRACT

If a control portion in a WAP terminal judges in step S1 that a session is established, the residual capacity of a memory portion is monitored at a predetermined time interval or any time interval in steps S2, S3. When the residual capacity of the memory portion is lower than a predetermined capacity, the control portion renews CPI information in step S5 and continues the operations of the steps S1 to S5 if the CPI information has not yet been renewed in step S4. If the CPI information has been renewed, the control portion continues the operations of the steps S1 to S4 without renewing the CPI information.

24 Claims, 5 Drawing Sheets

U.S. PATENT DOCUMENTS

| | | | |
|---|---|---|---|
| 6,842,836 B2 * | 1/2005 | Yun et al. | 711/167 |
| 7,203,739 B2 | 4/2007 | Ohto et al. | |
| 2004/0236831 A1 | 11/2004 | Ohto et al. | |

FOREIGN PATENT DOCUMENTS

| | | |
|---|---|---|
| JP | 04-181337 | 6/1992 |
| JP | 09-181767 | 7/1997 |
| JP | 10-164218 | 6/1998 |
| JP | 10-243048 | 9/1998 |
| JP | 2893019 | 2/1999 |
| JP | 11-73360 | 3/1999 |
| JP | 11-184780 | 7/1999 |
| JP | 2000-49847 | 2/2000 |
| JP | 2000-172599 | 6/2000 |
| JP | 2000-194612 | 7/2000 |
| JP | 2000-222277 | 8/2000 |
| WO | WO 00/39666 | 7/2000 |

OTHER PUBLICATIONS

WAG UAPROF, Version Nov. 10, 1999, *Wireless Application Group User Agent Profile Specification*, pp. 1-75, © Wireless Application Protocol Forum, Ltd. 1999.

Mobile Media Magazine, "Towards standardization of new HTML for mobile telephones," vol. 6, No. 7, C. Media Co., Ltd., Jun. 13, 1998, pp. 78-79.

Motoya Sasaki, "Towards content creation for cell phones with a built-in browser: The two schemes of HTML and WML," Nikkei Internet Technology, No. 12 Nikkei BP-sha, Jun. 22, 1998, pp. 106-113.

Yasuhiro Mizukoshi, et al., "Stationary agent type middleware 'Mobile internet communication technology," NEC Technical Journal, vol. 52, No. 4, Apr. 23, 1999, pp. 48 through 52.

Japanese Patent Office Action dated May 8, 2007.

* cited by examiner

OBJECT FILTERING METHOD AND CLIENT DEVICE USING THE SAME

BACKGROUND OF THE INVENTION

1. Field of the Invention

The present invention relates to an object filtering method and a client device using the same and particularly, to a method for filtering an object to a client by a proxy server and a client device using the same.

2. Description of the Related Art

At present, WAP (Wireless Application Protocol) has been known as a network connecting protocol for cellular phones. If a user uses a WAP-supporting telephone, he/she could access to the Internet or the like from a portable terminal such as a cellular phone or the like by a simple operating method, and thus could utilize an electronic mail and other contents.

Various considerations have been made on this protocol in the WAP forum, and the latest versions of WAP are on public view in associated WEB sites. According to the specification titled "WAG UAPROF Version Nov. 10, 1999 (Wireless Application Group User Agent Profile Specification)" of the above WAP latest versions, it is provided that parameters indicating the WAP content processing capability of a WAP client and a desired Content format are transmitted as CPI (Capability and Preference Information) to a WAP gateway when a session is established between the WAP client and the WAP gateway and also the parameters are cached at all times when the session is established.

Further, according to this specification, it is also provided that CPI can be renewed by the WAP terminal as occasion demands. In the WAP gateway or the WAP origin server, the types of contents or objects to be transmitted to WAP clients can be restricted by using information of CPI.

CPI can represent various types of characteristics on WAP clients for clients such as hardware characteristics of WAP clients (display size, color support ability or disability, image support ability or disability, maker names, etc.), software characteristic (OS (Operating System)) vendors or versions, MExE support ability or disability, information on audio encoders, information on video encoders, etc.), application characteristics/user request matters (the makers of browsers, versions of browsers, characteristics of description language, versions of description language, script-based language support ability or disability, etc.), WAP characteristics (bearer characteristics, etc.), etc.

As disclosed in Japanese Patent No. 2893019, a technique of efficiently performing object distribution in a push service is known as a technique of filtering objects.

In the conventional object filtering technique as described above, when a proxy server transmits an object to a client in response to a client's object acquiring request, the object can be transmitted to the client with being subjected to filtering in accordance with the capability of the client by referring CPI.

However, the object is transmitted to the client irrespective of variation of the residual amount of the memory capacity in the client. Therefore, when the residual amount of the memory capacity is reduced and thus the overall content of a new object cannot be stored, the client is required to discard the object without storing it or delete some old objects to store a newly received object.

If the client discards the received object without storing it, there would occur such a disadvantage that communication resources between the proxy server and the client are wasted. On the other hand, if the old objects are deleted to store new objects, there would occur such a disadvantage that an important object is carelessly deleted.

SUMMARY OF THE INVENTION

The present invention has an object to provide an object filtering method which can enhance the line using efficiency between a proxy server and a client, and avoid careless data deletion at the client side, and a client device using the object filtering method.

In order to attain the above object, according to a first aspect of the present invention, there is provided an object filtering method for filtering an object in a process of accessing, through a proxy server for relaying an access to various services of the Internet, a server which is disposed on the Internet and stores various types of objects and requesting the server to acquire a desired object, characterized by comprising: a step of monitoring the residual amount of a memory capacity in a client; a step of notifying a filtering condition from the client to the proxy server in accordance with the monitoring result; and a step of filtering the object in accordance with the filtering condition thus notified by the proxy server.

According to a second aspect of the present invention, there is provided a client device for accessing, through a proxy server for relaying an access to various services of the Internet, a server which is disposed on the Internet and stores various types of objects and requesting the server to acquire a desired object, characterized by comprising: control means for controlling an access to the Internet to achieve the object; and memory means for storing the object thus achieved, wherein when the control means detects that the memory residual amount of the memory means is equal to a predetermined memory residual amount or less, the control means notifies to the proxy server a filtering condition of an object to be transmitted to the client device self.

That is, according to the object filtering method of the present invention, in the process of accessing through the proxy server for relaying the access to various services of the internet to the server which is disposed on the Internet and stores various objects, and requesting a desired object to acquire the object, a client notifies a filtering condition to the proxy server in accordance with whether the residual amount of the memory capacity is large or small at the client side, and the proxy server subjects the object to filtering on the basis of the filtering condition.

The client monitors the residual amount of the memory capacity at all times or periodically, and when the residual amount is equal to a fixed amount or less, according to a predetermined style, the client transmits to the proxy server information data representing an object format that is allowed to be subsequently transmitted to the client, or an object format that is prohibited from being subsequently transmitted to the client. The object format may be a file attribute or the maximum data length.

After receiving the information from the client, in accordance with the information indicated in the information data thus received, the proxy server restricts the object to be transmitted to the client, that is, executes the filtering.

Through a series of operations described above, the line using efficiency between the proxy server and the client can be enhanced, and data are avoided from being carelessly deleted at the client side.

That is, according to the present invention, the number and type of objects to be transmitted from the proxy server to the client are restricted in accordance with whether the memory residual amount at the client side is large or small, or the number and type of objects that should not be transmitted from the proxy server to the client are restricted, thereby enhancing the line using efficiency between the proxy server and the client and avoid careless data deletion at the client side.

DETAILED DESCRIPTION OF THE PREFERRED EMBODIMENTS

Next, preferred embodiments according to the present invention will be described with reference to the accompanying drawings.

Figure 1:
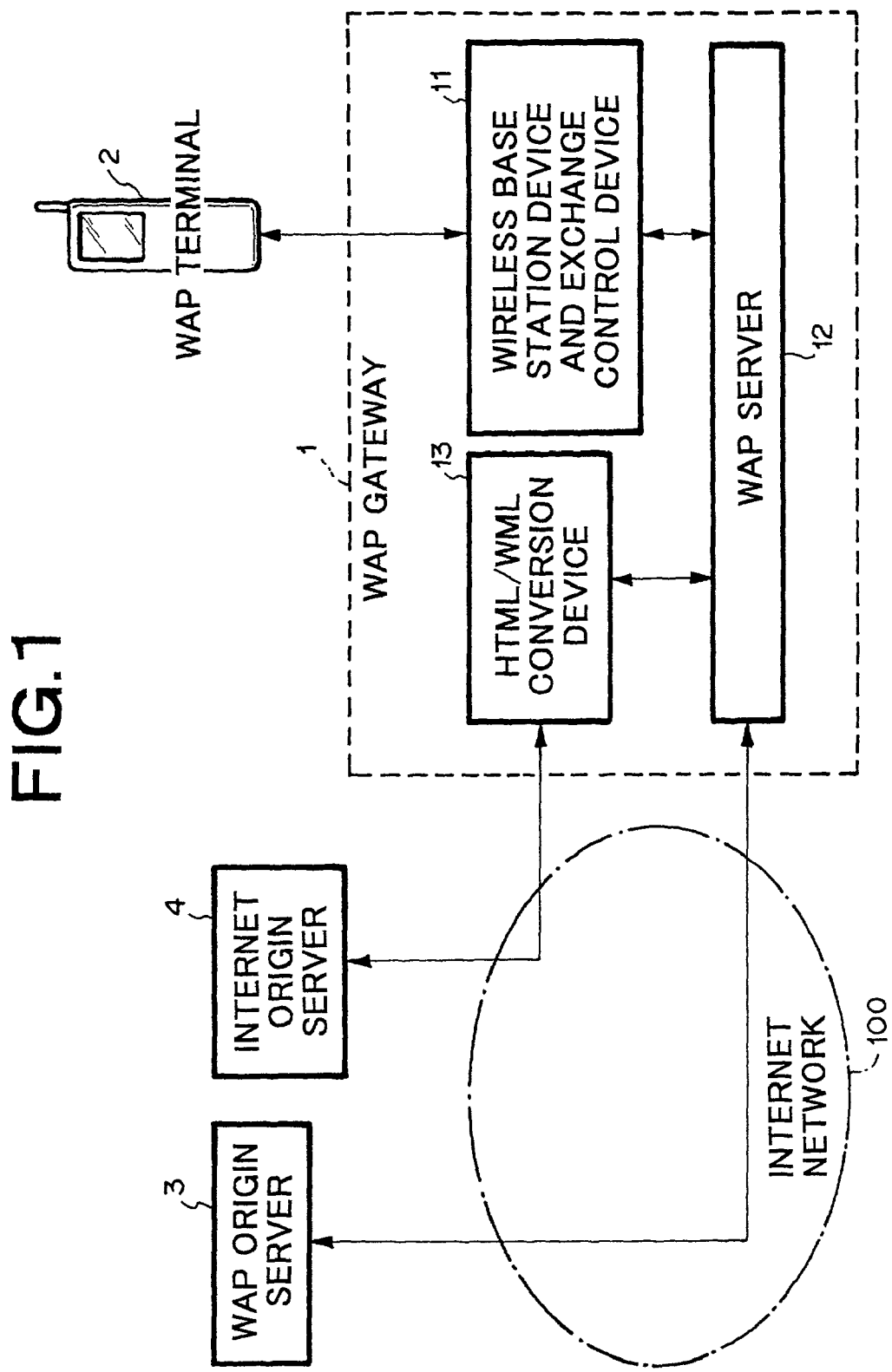
FIG. 1 is a block diagram showing the construction of a communication system according to an embodiment of the present invention.

FIG. 1 is a block diagram showing the construction of a communication system according to the present invention. In FIG. 1, the communication system according to an embodiment of the present invention comprises WAP (Wireless Application Protocol) gateway 1, WAP terminal 2, WAP origin server 3, Internet origin server 4 and Internet network 100.

The WAP gateway 1 comprises wireless base station device and exchange control device 11, WAP server 12 and HTML (Hyper Text Markup Language)/WML (Wireless Markup Language) conversion device 13.

According to WAP as a network connecting protocol for information communication terminals such as cellular phones or the like, the contents that are prepared for the WAP origin server 3 and described with WML are distributed to the WAP terminal 2 through the WAP gateway 1 having the function as a proxy server that is connected to the Internet network 100 and relays an access from the WAP terminal 2 to various services in the Internet network 100.

Further, the contents that are prepared for an Internet origin server 4 and described with HTML, which is a description language as a current Internet standard, can be converted from HTML to WML by the HTML/WML conversion device 13 in the WAP gateway 1 and can be distributed to the WAP terminal 2.

Data transmitted from the WAP terminal 2 are transmitted to the wireless base station device and exchange control device 11 in the WAP gateway 1, for example, and then transmitted from the wireless base station device and exchange control device 11 to the WAP origin server 3 through the WAP server 12.

Further, if the address of the data transmitted from the WAP terminal 2 is directed to the Internet origin server 4, the data are converted by the HTML/WML conversion device 13 in the WAP gateway 1 and then transmitted to the Internet origin server 4.

Figure 2:
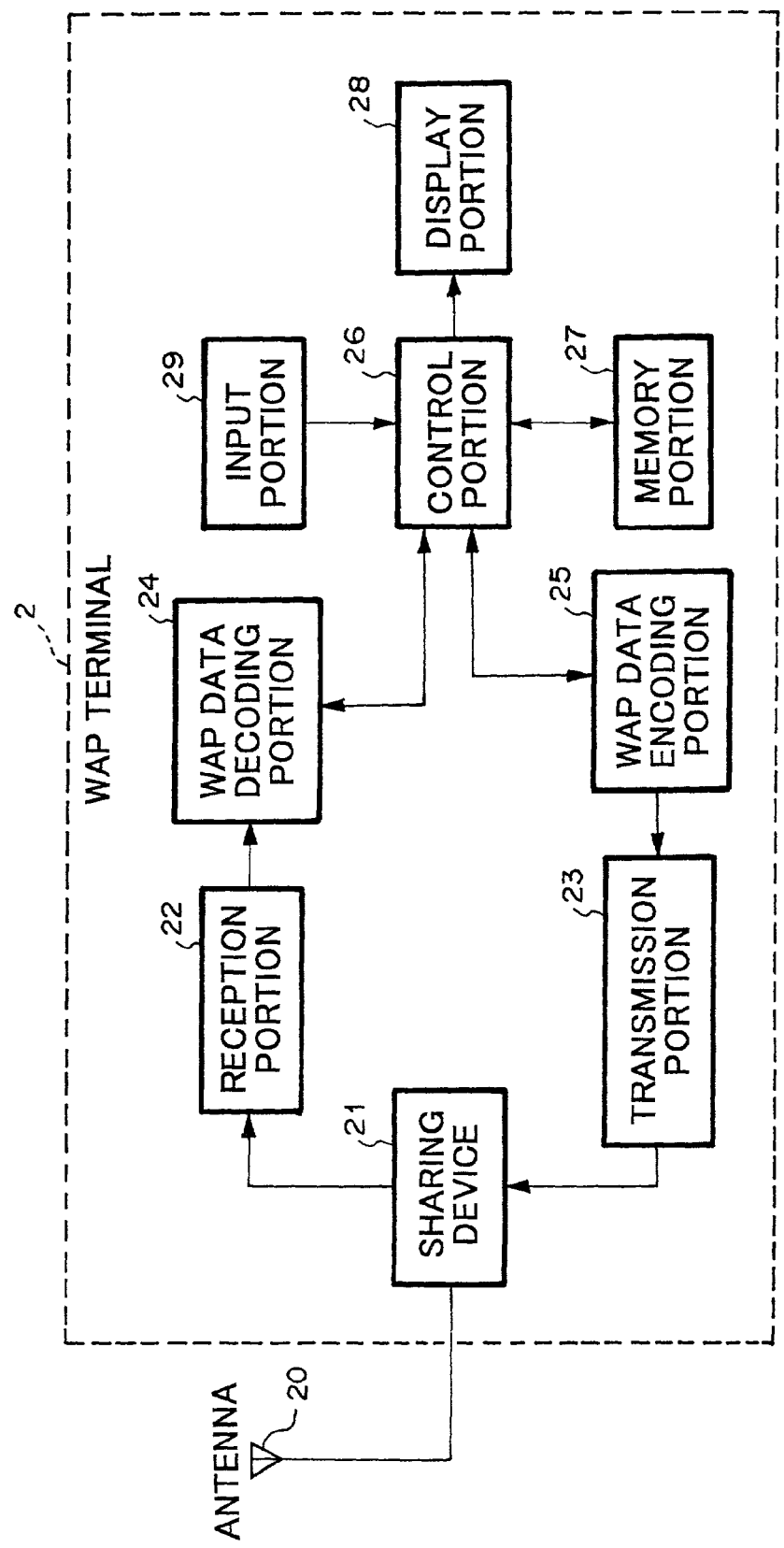
FIG. 2 is a block diagram showing the construction of a WAP terminal of FIG. 1.

FIG. 2 is a block diagram showing the construction of the WAP terminal 2 of FIG. 1. In FIG. 2, the WAP terminal 2 is equipped with antenna 20, sharing device 21, reception portion 22, transmission portion 23, WAP data decoding portion 24, WAP data encoding portion 25, control portion 26, memory portion 27, display portion 28 and input portion 29, and wireless communications are carried out between the WAP terminal 2 and the WAP gateway 1.

The antenna 20 of the WAP terminal 2 transmits/receives wireless signals. The sharing device 21 is used to commonly use one antenna 20 for both of a received wireless signal and a wireless signal to be transmitted. The wireless signal received is input through the sharing device 21 to the reception portion 22, and the transmission portion 23 inputs the wireless signal to the sharing device 21.

The WAP data decoding portion 24 decodes the data signal that are picked up from the wireless signal received by the reception portion 22. The WAP data encoding portion 25 encodes the WAP data contained in the wireless signal to be transmitted from the transmission portion 23.

The control portion 26 controls the operation of the WAP data decoding portion 24 and the WAP data encoding portion 25. The memory portion 27 is connected to the control portion 26 to store data transmitted from the WAP gateway 1 and data in the WAP terminal 2. The state of the WAP data transmitted from the WAP gateway 1 or the data in the WAP terminal 2 is displayed on the display portion 28 through control portion 26. Since the capacity of the memory portion 27 is restricted, the data transmitted from the WAP gateway 1 cannot be stored without limitation.

Figure 3:
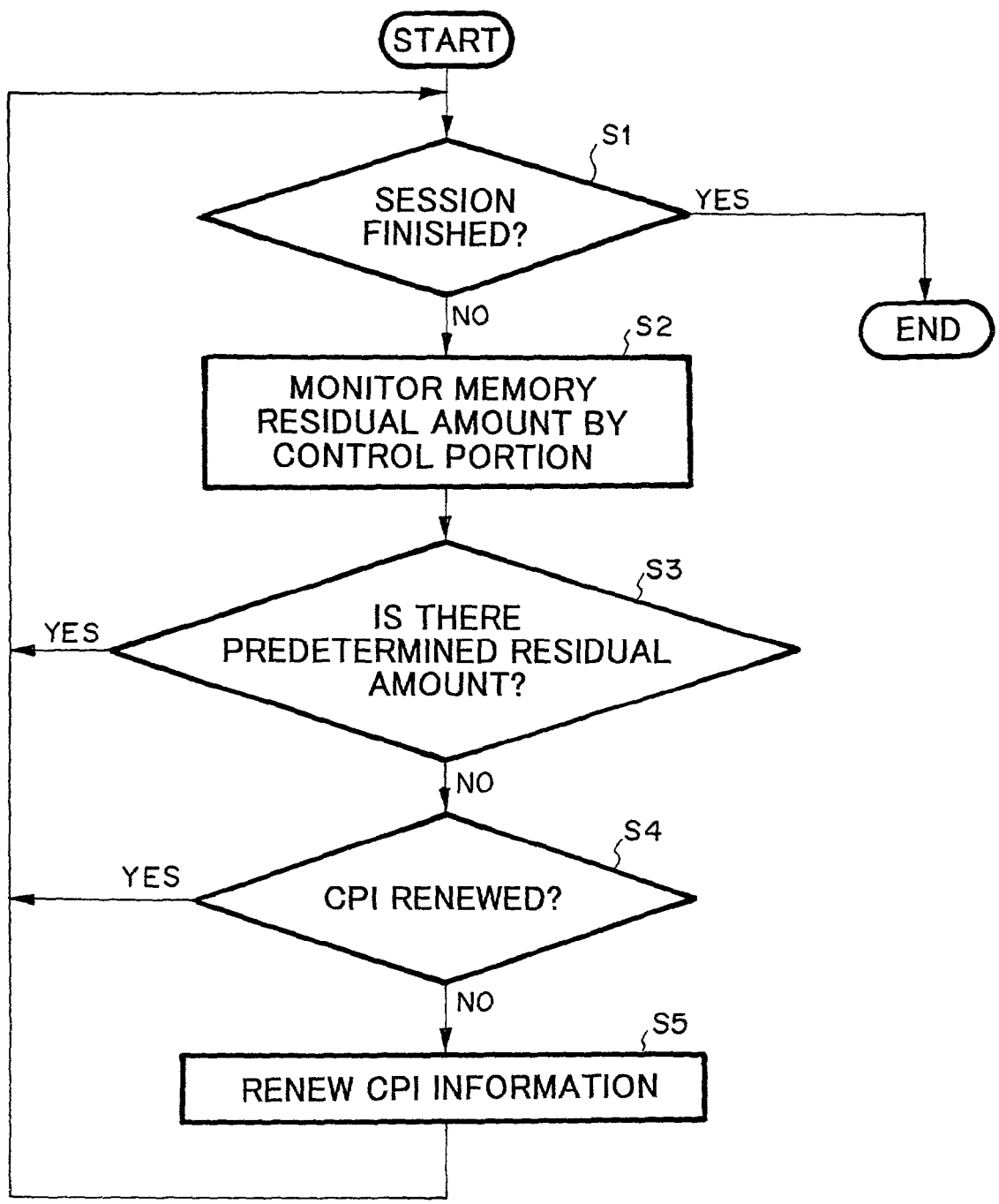
FIG. 3 is a flowchart showing the operation of the WAP terminal of FIG. 2.
Figure 4:
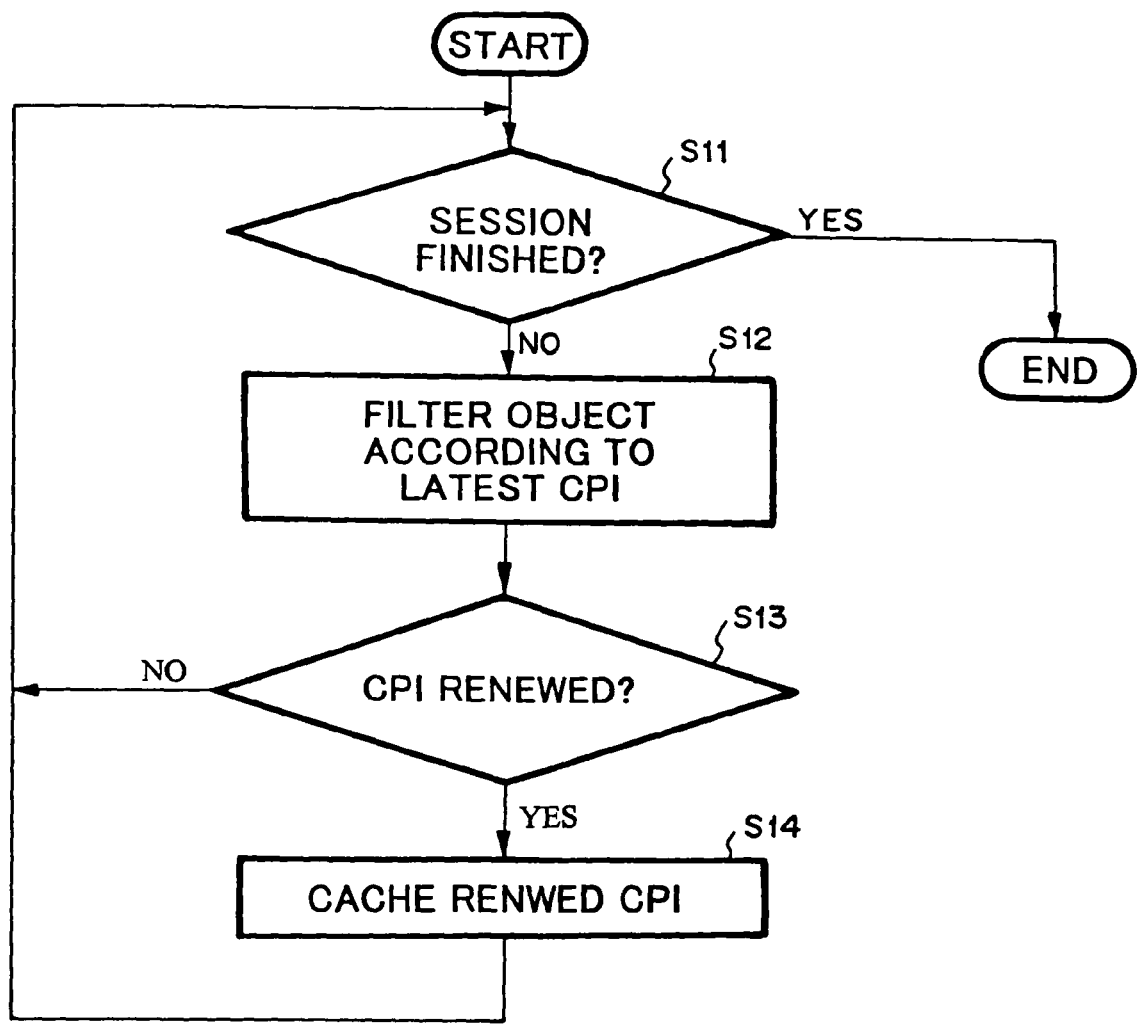
FIG. 4 is a flowchart showing the operation of a WAP gateway of FIG. 1.

FIG. 3 is a flowchart showing the operation of the WAP terminal 2 of FIG. 1, and FIG. 4 is a flowchart showing the operation of the WAP gateway 1 of FIG. 1. The processing operation of the object filtering method according to an embodiment of the present invention will be described with reference to FIGS. 1 to 4.

The operation of the WAP terminal 2 according to the present invention under the WAP environment thus constructed will be described.

When the WAP terminal 2 is supplied with a WAP service, it is required to establish a session with the WAP gateway 1. This is defined as WSP (Wireless Session Protocol) in the WAP specification. In the following description, it is assumed that the session has been established between the WAP terminal 2 and the WAP gateway 1 and the WAP data have been transmitted.

The control portion 26 in the WAP terminal monitors the state of the session at all times (step S1 of FIG. 3), and it monitors the residual capacity of the memory portion 27 at a predetermined time interval or optional time interval while the session is established (steps S2 and S3 of FIG. 3). Here, when the residual capacity of the memory portion 27 is larger than a predetermined capacity, the session-established state is monitored (step S1 of FIG. 3), and the residual capacity monitoring operation for the memory portion 27 is continued (steps S2 and S3 of FIG. 3).

However, when the residual capacity of the memory portion 27 is lower than the predetermined capacity, the control portion 26 judges whether CPI information has been already renewed (step S4 of FIG. 3). If the CPI information has not been renewed, the CPI information is renewed (step S5 of FIG. 3), and the operations of the steps S1 to S5 are continued. Here, if the CPI information has been already renewed, the operations of the steps S1 to S4 are continued without renewing the CPI information.

Next, the operation of the WAP gateway 1 will be described. In the following description, it is also assumed that the session has been established between the WAP terminal 2 and the WAP gateway 1 and the WAP data have been transmitted.

In the WAP gateway 1, the state of the session is monitored at all times (step S11 of FIG. 4), and an object to be transmitted from the origin server is subjected to filtering according to the latest CPI information while the session is established (step S12 of FIG. 4).

The WAP gateway 1 monitors whether the CPI information is renewed at all times (step S13 of FIG. 4). If the CPI information is renewed by the WAP terminal 2, the CPI information thus renewed is cached (step S14 of FIG. 4), and the operations of the steps S11 to S13 are continued.

As described above, the WAP terminal 2 monitors the memory residual amount at all times or periodically, and when the residual amount is reduced to a fixed amount or less, according to a predetermined style, the WAP terminal 2 transmits to the WAP gateway 1 information data representing an object format that is allowed to be subsequently transmitted to the WAP terminal 2 or an object that is prohibited from being subsequently transmitted to the WAP terminal 2. The object format may be a file attribute (for example, a filename extension of an object), or the maximum data length.

After receiving this information from the WAP terminal 2, in accordance with the information indicated in the information data thus received, the WAP gateway 1 restricts the object to be transmitted to the WAP terminal 2, that is, executes the filtering.

Through the above series of operations, the line using efficiency between the WAP gateway 1 and the WAP terminal 2 can be enhanced, and the careless data deletion at the WAP terminal side can be avoided.

As described above, in accordance with whether the memory residual amount at the WAP terminal 2 (client) side is large or small, the number and type of objects to be transmitted from the WAP gateway 1 (proxy server) to the WAP terminal 2 can be restricted, or the number and type of objects not to be transmitted from the WAP gateway 1 to the WAP terminal 2 can be restricted. Therefore, the line using efficiency between the WAP gateway 1 and the WAP terminal 2 can be enhanced, and careless data deletion at the WAP terminal 2 side can be avoided.

Figure 5:
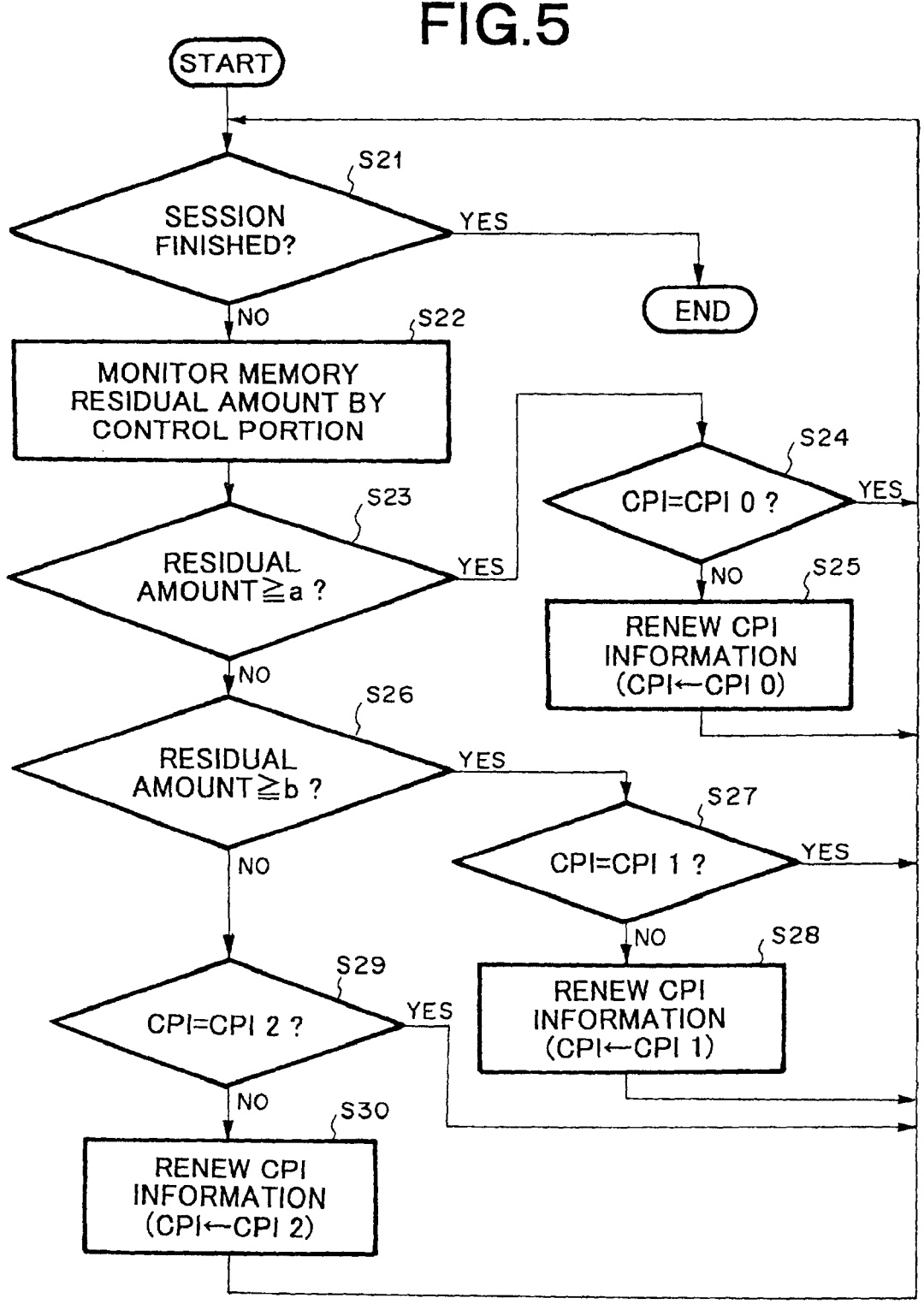
FIG. 5 is a flowchart showing the operation of a WAP terminal of another embodiment according to the present invention.

FIG. 5 is a flowchart showing the operation of the WAP terminal according to another embodiment of the present invention.

In the above-described embodiment, one memory residual amount judgment value is settled, and on the basis of the judgment value, it is judged whether the residual capacity of the memory portion 27 in the WAP terminal 2 is large or small, whereby the CPI information is renewed. In the following embodiment, two judgment values (a, b (a>b)) are settled, and it is judged by using these two judgment values a, b whether the residual capacity of the memory portion 27 in the WAP terminal 2 is large or not.

In the following description, the CPI information is renewed to "CPI0" at the time when the session is established, the CPI information is renewed to "CPI1" when the memory residual amount is equal to "b" or more, but lower than "a", and the CPI information is renewed to "CPI2" when the memory residual amount is lower than "b".

The following description will be made on the assumption that the session has been already established between the WAP terminal 2 and the WAP gateway 1, and the WAP data have been already transmitted.

In the control portion 26 of the WAP terminal 2, the state of the session is monitored at all times (step S21 of FIG. 5), and the residual capacity of the memory portion 27 is monitored at a predetermined time interval or optional time interval while the session is established (steps S22 and S23 of FIG. 5).

Here, when the residual capacity of the memory portion 27 is equal to or more than a predetermined first judgment value "a", the current CPI information is judged (step S24 of FIG. 5). If the CPI information is not "CPI0", the CPI information is renewed to "CPI0" (step S25 of FIG. 5). If the current CPI information is "CPI0", the operations of steps S21 to S23 are continued.

In the above judgment of the step S23, if the residual capacity of the memory portion 27 is lower than the predetermined first judgment value "a", the residual capacity is compared with a second judgment value "b" (step S26 of FIG. 5). If the residual capacity of the memory portion 27 is above "b", the current CPI information is judged (step S27 of FIG. 5). If the CPI information is not "CPI1", the CPI information is renewed to "CPI1" (step S8 of FIG. 5). If the current CPI information is "CPI1", the operations of the steps S21 to S26 are continued.

If the residual capacity of the memory portion 27 is lower than the predetermined second judgment "b" in the judgment of the step S26, the current CPI information is judged (step S29 of FIG. 5). If the CPI information is not "CPI2", the CPI information is renewed to "CPI2" (step S30 of FIG. 5). If the current CPI information is "CPI2", the operations of the steps S21 to S29 are continued.

According to this embodiment, the CPI information can be dynamically renewed in accordance with the increase/decrease of the residual capacity of the memory portion 27. For example, the CPI information may be set so that all the object formats can be received in the case of "CPI0", only the character data, audio data, still-picture data can be received in the case of "CPI1", and only the character data can be received in the case of "CPI2".

As described above, the number and type of objects to be transmitted from the proxy server (WAP gateway 1) to a client can be restricted or the number and type of objects not to be transmitted from the proxy server to the client can be restricted in accordance with whether the memory residual amount at the client (WAP terminal 2) side is large or small. Therefore, the line using efficiency between the proxy server and the client can be enhanced, and thus careless data deletion at the client side can be avoided.

In the above-described embodiments of the present invention, the client is set as the WAP terminal 2, and the proxy server is set as the WAP gateway 1. However, the client may be set as another cellular phone terminal, and the proxy server may be a gateway server of the cellular phone terminal, and also the client and the proxy server are not limited to these terminal and server.

As described above, according to the present invention, when objects are filtered in the process for accessing, through a proxy server for relaying an access to various services of the Internet, a server that is disposed on the Internet and stores various objects, thereby requesting and acquiring a desired object, the residual amount of the memory capacity of the client is monitored, and the filtering condition is notified from the client to the proxy server in accordance with the monitoring result, and the proxy server filters the objects to be transmitted to the client on the basis of the filtering condition thus notified, whereby the line using efficiency between the proxy server and the client can be enhanced and thus careless data deletion at the client side can be avoided.

What is claimed is:
1. An object filtering method for filtering an object, the object requested by a client from a server, the client accessing the server through a proxy server during a session, the method comprising:
periodically monitoring a residual amount of memory capacity in the client during said session to provide a plurality of monitoring results, said residual amount of memory capacity being an amount of unused memory capacity in the client that is free to accept data received by the client;

notifying a filtering condition from the client to said proxy server in accordance with at least one of the plurality of monitoring results; and filtering the object by said proxy server in accordance with the filtering condition thus notified.

2. The object filtering method as claimed in claim 1, wherein the filtering condition is notified from the client to said proxy server after an elapse of a predetermined time period since a previous notification.

3. The object filtering method as claimed in claim 2, wherein the predetermined time period is freely set from an external source.

4. The object filtering method as claimed in claim 1, wherein the filtering condition is valid only for a predetermined time period after the proxy server is notified of the filtering condition.

5. The object filtering method as claimed in claim 1, wherein the filtering condition is represented by a filename extension of the object.

6. The object filtering method as claimed in claim 5, wherein said proxy server prohibits only a file having the filename extension notified from the client as the filtering condition from being transmitted to the client.

7. The object filtering method as claimed in claim 5, wherein said proxy server allows only a file having no filename extension notified from the client as the filtering condition to be transmitted to the client.

8. The object filtering method as claimed in claim 1, wherein the filtering condition is represented by a data length of the object.

9. The object filtering method as claimed in claim 8, wherein said proxy server prohibits a file having a data length exceeding the data length notified from the client as the filtering condition from being transmitted to the client.

10. The object filtering method as claimed in claim 1, wherein the client is a cellular phone terminal.

11. The object filtering method as claimed in claim 1, wherein said proxy server is a gateway server for WAP (Wireless Application Protocol).

12. A client device for accessing a server through a proxy server during a session to request a desired object from the server, the client device comprising:

control means for controlling an access to said proxy server to acquire the object; and memory means for storing the object, wherein said control means is configured to periodically monitor a residual amount of memory capacity of said memory means during said session, said residual amount of memory capacity being an amount of unused memory capacity of the memory means that is free to accept data received by the client device; and wherein, when said control means detects that said residual amount of memory capacity of said memory means is equal to a predetermined residual amount or less, said control means notifies to said proxy server a filtering condition of the object transmitted to the client device.

13. The client device as claimed in claim 12, wherein said control means periodically notifies filtering conditions to said proxy server at predetermined time periods.

14. The client device as claimed in claim 13, wherein the predetermined time periods are freely set from an external source.

15. The client device as claimed in claim 12, wherein the filtering condition is represented by a filename extension of the object.

16. The client device as claimed in claim 12, wherein the filtering condition is represented by a data length of the object.

17. The client device as claimed in claim 12, wherein said client device is a cellular phone terminal.

18. The client device as claimed in claim 12, wherein said client device is a WAP (Wireless Application Protocol) terminal.

19. A client device for accessing a server through a proxy server during a session to request a desired object from the server, the client device comprising:

a controller for controlling an access to said proxy server to acquire the object; and a memory unit for storing the object;

wherein said controller is configured to periodically monitor a residual amount of memory capacity of said memory unit during said session, said residual amount of memory capacity being an amount of unused memory capacity of the memory unit that is free to accept data received by the client device; and wherein, when said controller detects that said residual amount of memory capacity of said memory unit is equal to a predetermined residual amount or less, said controller notifies to said proxy server a filtering condition for filtering the object.

20. The client device of claim 19, wherein the filtering condition is represented by a data length of the object.

21. The client device of claim 19, wherein the controller is configured to establish the session between the client device and the proxy server using WSP (Wireless Session Protocol).

22. The client device of claim 19, wherein the controller is configured to establish the session between the client device and the proxy server; and wherein the session is maintained until the session is terminated by the client device or the proxy server.

23. The client device of claim 19, wherein the residual amount of memory capacity of the memory unit is able to change as data is stored in said memory unit.

24. The client device of claim 19, wherein the residual amount of memory capacity of the memory unit is less than a total amount of memory capacity of the memory unit.

* * * * *